United States Patent
Mon et al.

(10) Patent No.: US 8,738,450 B2
(45) Date of Patent: *May 27, 2014

(54) AUDIBLE TRANSACTION PROCESS AND SYSTEM

(75) Inventors: Felix A. Mon, Jacksonville, FL (US); Robert J. MacKenzie, Enfield, CT (US); Susan Smith Thomas, Gastonia, NC (US); Carl Frederick, II, Newark, DE (US); Jason Michael Ackiss, Matthews, NC (US); Maile George, Concord, CA (US); Robert Fleetwood Armstrong, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 221 days.

This patent is subject to a terminal disclaimer.

(21) Appl. No.: 12/695,833

(22) Filed: Jan. 28, 2010

(65) Prior Publication Data
US 2011/0184819 A1 Jul. 28, 2011

(51) Int. Cl.
*G06Q 20/00* (2012.01)
*G06Q 40/00* (2012.01)

(52) U.S. Cl.
USPC .............................................. 705/16; 705/43

(58) Field of Classification Search
None
See application file for complete search history.

(56) References Cited

U.S. PATENT DOCUMENTS

| | | | | |
|---|---|---|---|---|
| 5,589,855 A | * | 12/1996 | Blumstein et al. | 345/173 |
| 5,758,322 A | * | 5/1998 | Rongley | 704/275 |
| 5,762,376 A | * | 6/1998 | Taskett | 283/57 |
| 7,644,039 B1 | * | 1/2010 | Magee et al. | 705/43 |
| 7,774,231 B2 | * | 8/2010 | Pond et al. | 705/15 |
| 7,814,015 B2 | * | 10/2010 | Benedyk et al. | 705/41 |
| 7,822,688 B2 | * | 10/2010 | Labrou et al. | 705/67 |
| 7,835,942 B1 | * | 11/2010 | Pavlic et al. | 705/16 |
| 7,865,448 B2 | * | 1/2011 | Pizarro | 705/65 |
| 2002/0147658 A1 | * | 10/2002 | Kwan | 705/26 |
| 2002/0181710 A1 | * | 12/2002 | Adam et al. | 380/270 |
| 2003/0055735 A1 | * | 3/2003 | Cameron et al. | 705/26 |
| 2003/0074328 A1 | * | 4/2003 | Schiff et al. | 705/75 |
| 2005/0172148 A1 | * | 8/2005 | Ying | 713/200 |
| 2007/0174082 A1 | * | 7/2007 | Singh | 705/1 |

(Continued)

OTHER PUBLICATIONS

Web link: http://www.reghardware.co.uk/2009/05/25/handset_apps_for_blind/print/html, Phone Apps Help Blind 'see'(video), 2 pages.

(Continued)

*Primary Examiner* — Mussa A Shaawat
(74) *Attorney, Agent, or Firm* — Moore and Van Allen, PLLC; Michael A. Springs; Patrick B. Horne

(57) ABSTRACT

Systems, methods, and computer program products are provided for assisting a consumer during a transaction with a vendor at a point of sale by providing transaction information to the consumer in an audible format. The system includes a consumer device and a payment terminal located proximate the point of sale. The consumer device, either a mobile device carried by the consumer or an immobile device also located proximate the point of sale, communicates with the payment terminal and receives transaction information such as product identity or amount information. The consumer device then produces sound waves audible to the consumer based on the communicated transaction information using one or more private and/or public listening devices. This audible transaction process can be performed automatically during a transaction or can be implemented based on consumer preference.

49 Claims, 4 Drawing Sheets

(56) References Cited

U.S. PATENT DOCUMENTS

| | | | | |
|---|---|---|---|---|
| 2008/0208742 | A1* | 8/2008 | Arthur et al. | 705/41 |
| 2008/0257957 | A1* | 10/2008 | Steinecker | 235/380 |
| 2008/0270246 | A1* | 10/2008 | Chen | 705/17 |
| 2009/0048916 | A1* | 2/2009 | Nuzum et al. | 705/14 |
| 2009/0171799 | A1* | 7/2009 | Ying | 705/18 |
| 2009/0281904 | A1* | 11/2009 | Pharris | 705/17 |
| 2010/0169182 | A1* | 7/2010 | Madani | 705/21 |
| 2010/0299212 | A1* | 11/2010 | Graylin et al. | 705/14.66 |
| 2010/0312703 | A1* | 12/2010 | Kulpati et al. | 705/44 |
| 2011/0087589 | A1* | 4/2011 | Chan et al. | 705/39 |
| 2011/0093351 | A1* | 4/2011 | Afana | 705/16 |
| 2011/0202465 | A1* | 8/2011 | Mashhour | 705/67 |

OTHER PUBLICATIONS

Web link: http://www.knfbreader.com/products-mobile.php; "knfbReader Mobile", 2 pages.

Web link: http//www.maccast.com/2009/07/01/maccast-2009-07-01-iphone-3gs-accessibility/; 6 pages.

Website: http://www.snaptell.com/; 1 page.

Hackman, Mark, "Hands Off with Google Goggles", Dec. 8, 2009, Web link: http://www.pcmag.com/article2/0,2817,2356786,00.asp; 4 pages.

Web link: http://braillebookstore.com/view.php?T=Pocket+Money+Brailler, Product=Pocket Money Brailler; 2 pages.

Pickens, Hugh, "BrainPort Lets the Blind 'See' With Their Tongues"; Web link: http://hardware.slashdot.org/article.pl?sid=09/08/22/2035256; 3 pages.

Caesar, "New Graphic Displays for the Blind", Dec. 22, 2004; Web link: http://www.physorg.com/news2474.html.

Website: http://maxiaids.com/store/prodIndex.asp?idStore=1 [Products for Independent Living: Blind & Low Vision Store]; 2 pages.

MacDonald, Jay (Bankrate.com), "Changes to Currency May Help the Blind", Oct. 13, 2008 Web link: http://bankrate.com/finance/checking/changes-to-currency-may-help-the-blind-1.aspx; 2 pages.

MacDonald, Jay (Bankrate.com), "Changes to Currency May Help the Blind", Oct. 13, 2008 Web link: http://bankrate.com/yho/news/pf/20081013_blind_currency_changes_a2.asp; 2 pages.

O'Brien, Maggie and Jordon, Steve (Omaha World-Herald), "No Single Solution to Blind-Friendly Currency", May 21, 2008, web link: http://www.acb.org/nebraska/legislation/accessible-currency/news-articles/no-single-solution-to-blind-friendly-currency.html; 5 pages.

Web link: www.halfbakery.com/idea/blind_20friendly_20currency; Blind Friendly Currency, 15 pages.

Website: www.acb.org/resources/index.html; American Council of the Blind Helpful Resources for Blind and Visually Impaired Persons, 4 pages.

Web link: www.abledata.com/abledata.cfm?pageid=19327&top=14673&trail=22,13134&discontinued=0, Products: Voice Output Paper Money Identifier, 2 pages.

Vicini, James (Washington, D.C.), "U.S. Court: Currency Discriminates Against the Blind", May 20, 2008, Web Link: http://www.reuters.com/article/idUSN2030825720080520, 3 pages.

eHow Contributing Writer, Web link: http://www.ehow.com/how_2043858_help-blind-arrange-currency-their.html, 2 pages.

Web link: http://en.wikipedia.org/wiki/Wired_glove [Wired Glove Information]; 3 pages.

* cited by examiner

AUDIBLE TRANSACTION PROCESS AND SYSTEM

FIELD

In general, embodiments of the invention relate to point of sale transactions, and, more particularly, relate to systems, methods, and computer program products for providing a consumer with an audible transaction at a point of sale.

BACKGROUND

When engaged in a point-of-sale (POS) transaction, a consumer typically has the opportunity to review information regarding the goods and/or services being purchased on a video display as the products are scanned. The information provided to the consumer may include the name of the product being purchased, the quantity being purchased, the price of the product, discounts applied to the price of the product and other information. In some configurations, the video display is shared by both the cashier and the consumer, and the screen is turned so that both cashier and consumer may view the display. Typically the cashier is behind a counter opposite the consumer. In such a configuration, creating an unobstructed line of sight to the video display for both the cashier and the consumer may prove difficult. In other configurations, a separate video display is provided for both the cashier and the consumer. However, viewing the video display may be difficult or impossible for many consumers, such as consumers with visual impairment. Additionally, use of the video display may be difficult for consumers that are distracted, such as consumers having children. Various other consumers may simply prefer not to read the information provided on the video display. Therefore, systems and methods are needed to provide alternative ways for receiving transaction information at a POS.

SUMMARY

Systems, methods, and computer program products are provided for assisting a consumer during a transaction with a vendor at a point of sale by providing transaction information to the consumer in an audible format. In one embodiment, a method includes establishing a connection between a consumer device and a payment terminal disposed proximate a point of sale, communicating transaction information between the payment terminal and the consumer device, and producing an audible transaction information signal based at least in part on some or all of the transaction information. The audible transaction information signal is configured to be used for producing sound waves audible to the consumer. In some embodiments, the transaction is a purchase of one or more products. In some embodiments, the consumer device is a mobile device such as a smartphone, personal digital assistant, personal global positioning system receiver, cellular phone or personal music player. In others, the consumer device is an immobile device disposed proximate the point of sale. In some of these embodiments, establishing a connection includes establishing a permanent connection between the consumer device and the payment terminal.

In some embodiments, the method includes producing sound waves audible to the consumer using the audible transaction information signal, and in some, the method includes establishing a connection between the consumer device and a personal listening device. In some, the personal listening device produces the sound waves audible to the consumer. In some embodiments, the personal listening device is selected from the group consisting of a set of headphones, a headset, one or more earphones, one or more ear-buds, one or more hearing assistance devices, and one or more personal speakers.

In some embodiments, the method includes establishing a connection between the consumer device and a public listening device and the sound waves audible to the consumer are produced with the public listening device which, in some embodiments, includes one or more speakers. The transaction information, in some embodiments, includes at least selected from the group consisting of product identification information, product quantity information, product pricing information, product discount information, running balance owed information, final balance owed information, and payment method information.

Embodiments of the invention also provide an audible transaction system including a consumer device and a payment terminal disposed proximate the point of sale and configured to connect with the consumer device and communicate transaction information to the consumer device. The consumer device is configured to process the transaction information to create an audible transaction information signal based at least in part on some or all of the transaction information. The consumer device is also configured to communicate the audible transaction information signal. In some embodiments, the system includes a listening device for communicating with the consumer device and receiving the audible transaction information signal. The listening device also produces sound waves audible to the consumer using the audible transaction information signal. In some embodiments, the listening device is part of the consumer device. In some embodiments, the listening device includes one or more personal listening devices such as a set of headphones, a headset, one or more earphones, one or more ear-buds, one or more hearing assistance devices, or one or more personal speakers. In other embodiments, the listening device includes one or more public listening devices such as one or more public speakers.

In some embodiments of the system, the transaction includes the purchase of one or more products. In some, the consumer device is a mobile device such as a smartphone, a personal digital assistant, a personal global positioning system receiver, a cellular phone, and a personal music player, and in others, the consumer device is an immobile device disposed proximate the point of sale. In some of the former embodiments, the consumer device and the payment terminal are connected wirelessly. In some of the latter embodiments, the immobile consumer device is permanently connected with the payment terminal. The transaction information, in some embodiments, is product identification information, product quantity information, product pricing information, product discount information, running balance owed information, final balance owed information, or payment method information.

In accordance with other embodiments of the invention, an apparatus is provided that includes means for establishing a connection between a consumer device and a payment terminal disposed proximate a point of sale, means for communicating transaction information between the payment terminal and the consumer device, and means for producing an audible transaction information signal based at least in part on some or all of the transaction information. The audible transaction information signal is intended to be used for producing sound waves audible to the consumer. In various embodiments, the means for establishing a connection includes means for establishing a permanent connection between the consumer device and the payment terminal. In others, the apparatus also includes means for producing sound waves audible to the consumer using the audible transaction information signal.

In accordance with other embodiments of the invention, a computer program product includes a computer-readable medium comprising computer-readable instructions including instructions for establishing a connection between a consumer device and a payment terminal disposed proximate a point of sale. The instructions also include instructions for communicating transaction information between the payment terminal and the consumer device and instructions for producing an audible transaction information signal based at least in part on some or all of the transaction information. The audible transaction information signal is intended to be used for producing sound waves audible to the consumer.

In some embodiments of the computer program product, the transaction includes the purchase of one or more products. In some, the consumer device is a mobile device such as a smartphone, a personal digital assistant, a personal global positioning system receiver, a cellular phone, and a personal music player, and in others, the consumer device is an immobile device disposed proximate the point of sale. In some of the former embodiments, the consumer device and the payment terminal are connected wirelessly. In some of the latter embodiments, the immobile consumer device is permanently connected with the payment terminal. The transaction information, in some embodiments, is product identification information, product quantity information, product pricing information, product discount information, running balance owed information, final balance owed information, or payment method information.

In some embodiments of the computer program product, the instructions for establishing a connection include instructions for establishing a permanent connection between the consumer device and the payment terminal. In some embodiments, additional instructions for producing sound waves audible to the consumer using the audible transaction information signal are provided. In some of these embodiments, additional instructions establish a connection between the consumer device and a personal listening device. In these, the instructions for producing sound waves audible to the consumer include instructions for using the personal listening device, which is typically a set of headphones, a headset, one or more earphones, one or more ear-buds, one or more hearing assistance devices, and one or more personal speakers.

In some embodiments of the computer program product, the instructions include instructions for establishing a connection between the consumer device and a public listening device wherein the instructions for producing sound waves audible to the consumer include instructions for using the public listening device such as one or more public speakers.

In accordance with other embodiments of the invention, an apparatus assists a consumer during a transaction with a vendor at a point of sale, the point of sale including a terminal. The apparatus includes an input device configured to receive transaction information from the terminal and a processor configured to generate an audible transaction information signal based at least in part on some or all of the transaction information, the audible transaction information signal to be used for producing sound waves audible to the consumer. In some embodiments, the apparatus includes a speaker configured to use the audible transaction information signal to generate sound waves audible to the consumer. In some, the input device includes a camera configured to receive an image of transaction information displayed on a display device of the terminal, and wherein the processor is configured to determine the transaction information from the image. In some embodiments, the image includes a video of the display device, and in others, the apparatus includes a memory including computer executable program code stored therein for determining transaction information from images of the display device and generating the audible transaction information signal based on the determined transaction information.

In accordance with other embodiments of the invention, a computer program product includes a computer readable medium having computer executable program code stored therein. The code includes a first executable portion configured to receive transaction information from a point of sale terminal and a second executable portion configured to generate an audible transaction information signal based at least in part on some or all of the transaction information, the audible transaction information signal to be used for producing sound waves audible to the consumer. In some embodiments, the first executable portion is configured to receive transaction information in the form of an image of the transaction information displayed on a display device of the point of sale terminal, and the second executable portion is configured to determine the transaction information from the image and generate the audible transaction information signal based thereon. In other embodiments, the image includes video of the display device displaying transaction amount information.

BRIEF DESCRIPTION OF THE DRAWINGS

Figure 1:
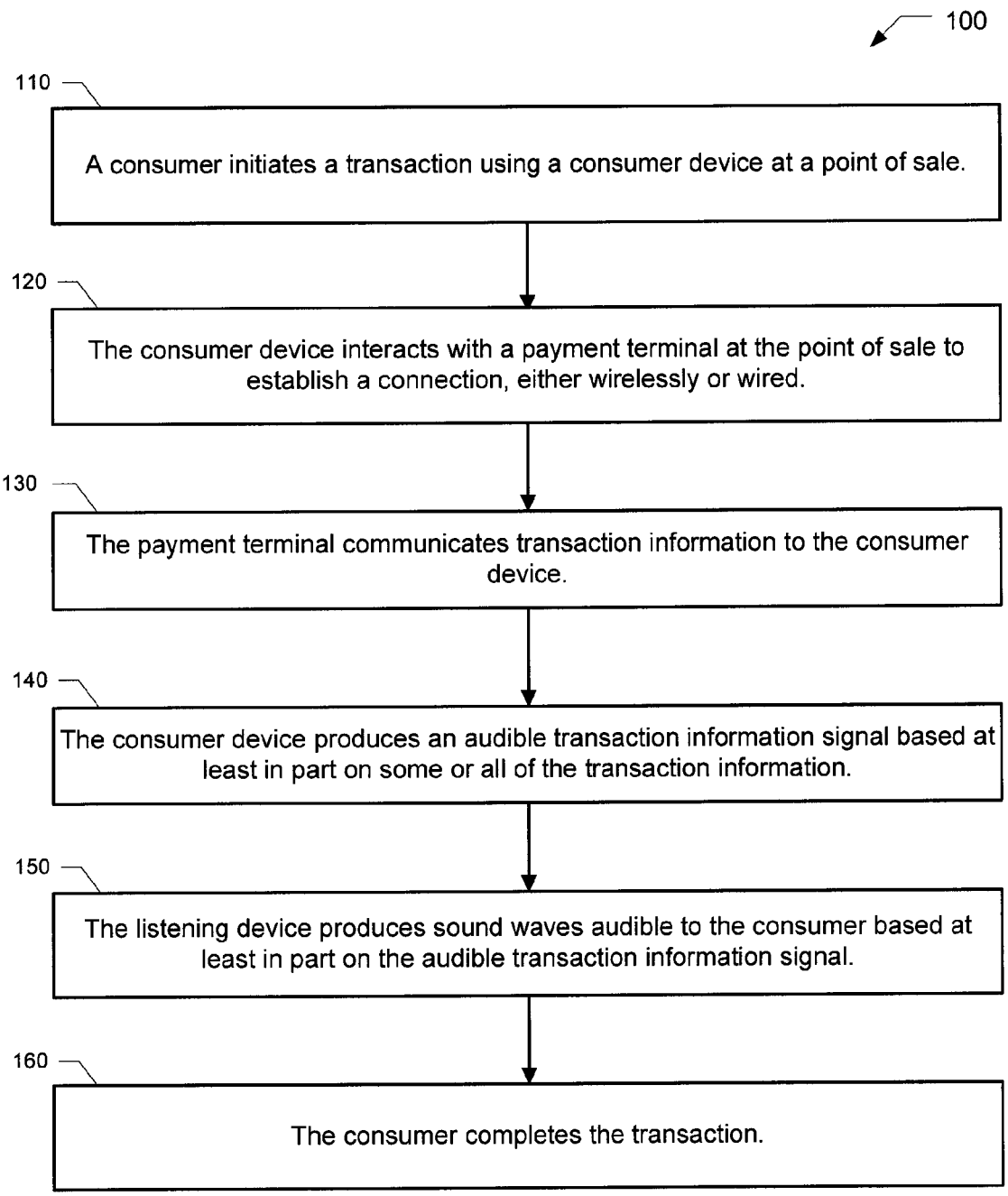
Figure 2:
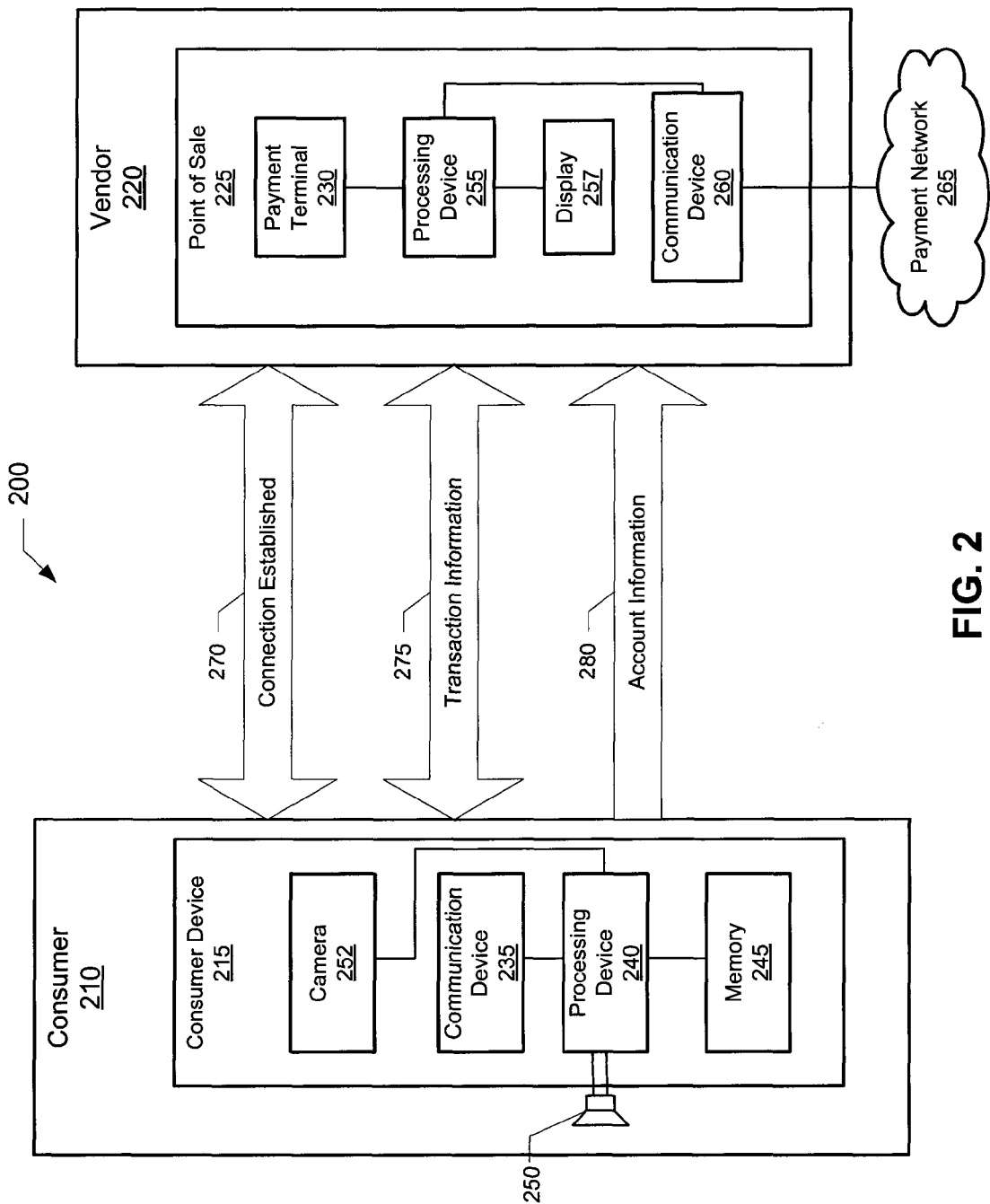
Figure 3:
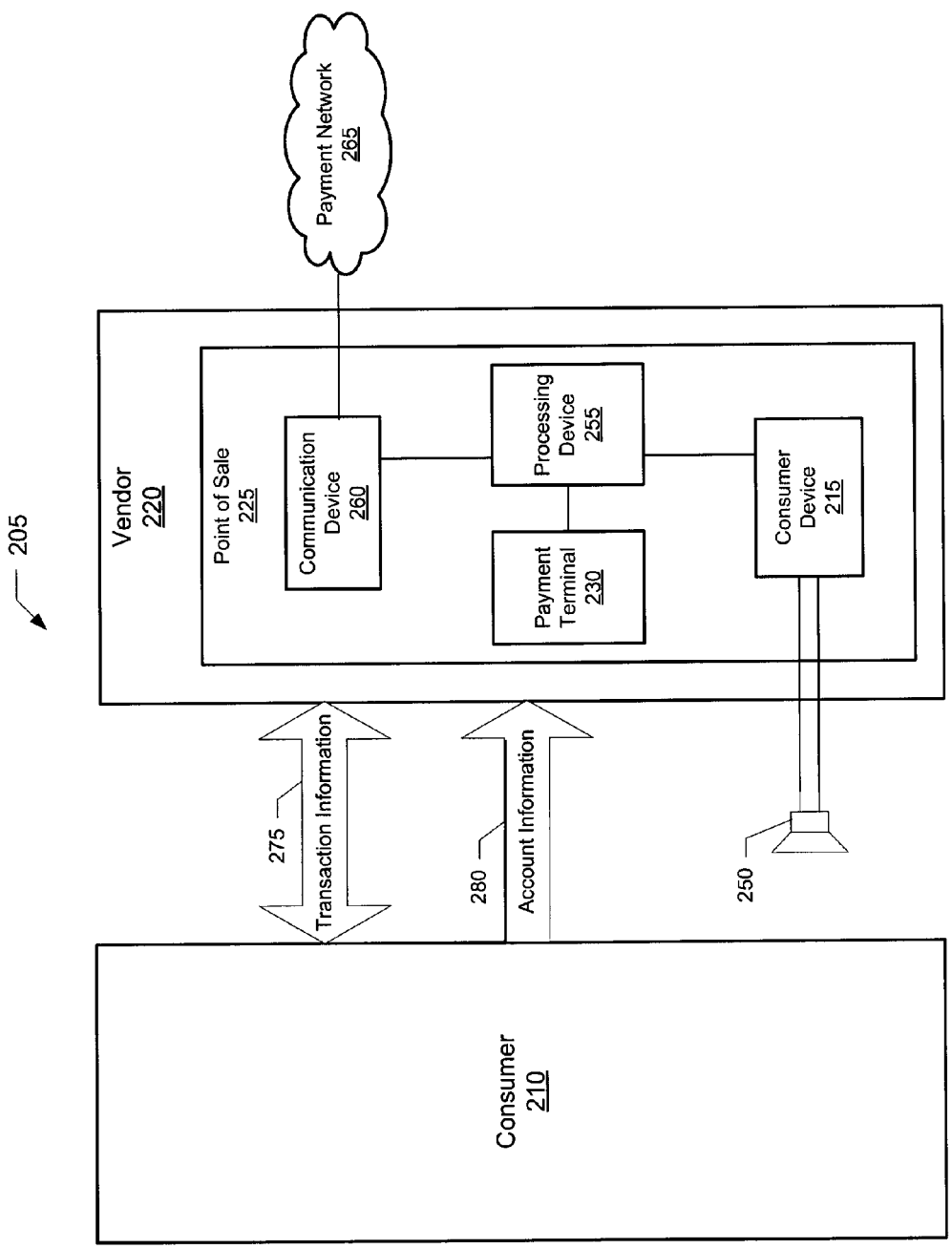
Figure 4:
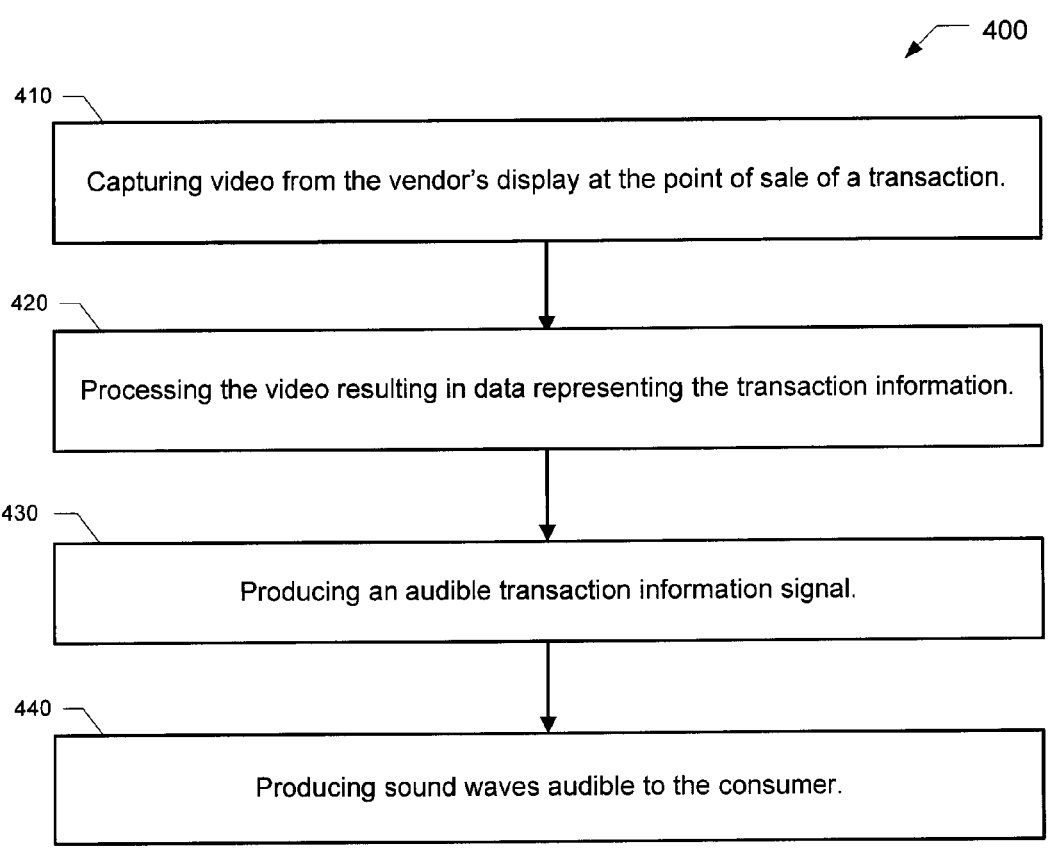

Having thus described embodiments of the invention in general terms, reference will now be made to the accompanying drawings, which are not necessarily drawn to scale, and wherein:

FIG. 1 is a flow diagram illustrating an audible transaction process, in accordance with one embodiment of the present invention;

FIG. 2 is a block diagram providing a more detailed illustration of an audible transaction system, in accordance with one embodiment of the present invention;

FIG. 3 is a block diagram providing a more detailed illustration of an audible transaction system, in accordance with another embodiment of the present invention; and FIG. 4 is a flow diagram illustrating a visual recognition audible transaction process, in accordance with one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 is a flow diagram illustrating an audible transaction process 100 in accordance with one embodiment of the present invention. As represented by block 110, a consumer initiates a transaction using a consumer device at a point of sale. For example, the consumer may initiate a transaction to purchase goods or services from a vendor. In one embodiment, a consumer approaches the point of sale carrying a consumer device such as a cellular phone, smartphone, personal digital assistant (PDA), personal navigation device such as a global positioning system (GPS) receiver, personal music player such as a Moving Picture Experts Group Layer-3 Audio (MP3) player, or the like and requests the purchase of goods and/or services. In some embodiments, the consumer device is a wireless communication device and in others the consumer device is configured for connecting via a wired connection. In some embodiments, the consumer device is part of the point of sale and is not a mobile device carried by the consumer.

As used herein, "transaction" refers to any interaction between a consumer and vendor proximate the vendor's point of sale. For example, a consumer may interact with a payment terminal proximate the point of sale of the vendor in order to receive transaction information and provide consumer input. As used herein, "payment terminal" refers to any terminal proximate the point of sale and operated by the vendor in order to interact with one or more consumers. For example, in some embodiments, a payment terminal may include, but is not limited to, a keypad, a monitor, a card-reading device and the like. In some embodiments, a payment terminal includes one or more of a processing device, a communication device, an input device and other components or one or more of those components are separate from the payment terminal and are configured for communicating with the payment terminal.

As represented by block 120, the consumer device interacts with a payment terminal at the point of sale, via either a wireless or wired connection. In one embodiment the user device is configured for a wired connection. In such a configuration, the consumer physically connects the consumer device with the payment terminal. For example, in one embodiment, the payment terminal includes a universal serial bus (USB) cable for connecting with a consumer device, and the consumer recognizes the cable and connects the consumer device via the USB cable. In other embodiments, the consumer device connects with the payment terminal wirelessly. Such a connection can be initiated by either the consumer device or the payment terminal. For example, in one embodiment the consumer device is a smartphone having wireless communication capabilities. The smartphone recognizes the presence of the payment terminal at the point of sale and begins wireless communication with the payment terminal. In another embodiment the payment terminal at the point of sale recognizes the presence of the consumer device and begins wireless communication with the consumer device.

In some embodiments, the interaction between the consumer device and the payment terminal includes authentication of the identity of the consumer. The type of authentication varies drastically across various points of sale. For example, in one embodiment, the identity of the consumer is authenticated by the consumer using the consumer device to communicate some type of security code such as a PIN number or answer one or more security questions. Authentication can be performed using one security measure or multiple security measures. For example, in one embodiment, two security measures are required. The consumer device, in this example, is a consumer's mobile device and during interaction with the payment terminal, the mobile device communicates identification information to the payment terminal. Additionally, the consumer is prompted by the mobile device, typically upon receipt of instructions from the payment terminal, to enter either a PIN number or some other consumer input tending to identify the consumer. In some embodiments other types of security measures are used such as, but not limited to, biometrics, iris recognition, fingerprinting and the like.

As represented by block 130, once the consumer device and the payment terminal have established a connection, the payment terminal communicates transaction information to the consumer device. For example, a consumer may be purchasing goods from a cashier in a store. As the goods are scanned, the payment terminal communicates information related to the products being scanned, such as information indicating the name of the product being scanned and the price of the product being scanned. Once all the goods have been scanned at the point of sale in order to identify the goods, the payment terminal determines the balance owed for the transaction. Then, the payment terminal communicates transaction information including, but not limited to, product identification information, product quantity information, product pricing information, product discount information, running balance owed information, final balance owed information, and payment method information.

As represented by block 140, the consumer device then produces an audible transaction information signal based at least in part on some or all of the transaction information received from the payment terminal.

As represented by block 150, the listening device produces sound waves audible to the consumer based at least in part on the audible transaction information signal received from the consumer device. In some embodiments, the consumer device includes the listening device for audibly communicating the information to the consumer. In some embodiments, the consumer device includes a listening port such as a headphone jack so that the consumer may receive the audible information via headphones, headset, earphones, ear-buds, hearing assistance devices such as hearing aids or the like. In some embodiments, the listening device includes a personal listening device such as a set of headphones, a headset, earphones, ear-buds, hearing assistance devices such as hearing aids, one or more personal speakers or the like for connecting with the consumer device and providing audible sound waves to the consumer. In other embodiments, the listening device is a public listening device such as one or more public speakers or some other public listening device that publishes sound waves into surrounding areas so that any person proximate the area might listen. Herein a personal speaker refers to a low-output speaker configured for providing audible sound waves predominantly to an individual while minimizing public exposure to the sound waves. A public speaker refers herein to a speaker having a higher output than a personal speaker such that individuals other than the consumer may be exposed to the sound waves it produces. In the private listening embodiments, discretion is maintained because other nearby consumers need not become aware that the consumer is utilizing an audible transaction process 100. For example, as products are being scanned at the point of sale, the consumer device, which is connected with or includes a personal listening device, provides audible information to the consumer without nearby people being exposed to public messages concerning the transaction, thereby maintaining a high degree of discretion.

As represented by block 160, the consumer then completes the transaction. In some embodiments, the consumer device prompts the consumer to provide account information for payment of the balance owed. Then, the consumer may enter bank account information such as credit or debit account information. In some embodiments, the consumer device stores information regarding a particular credit or debit account from which the vendor can obtain payment. In such embodiments, the consumer device can be configured to prompt the consumer to choose the account from which the consumer desires payment to be made, or the consumer device can be configured to automatically provide payment from a predetermined account.

As used herein, a "bank account" refers to a credit account, a debit/deposit account, or the like. Although the phrase "bank account" includes the term "bank," the account need not be maintained by a bank and may, instead, be maintained by other financial institutions. As used herein, unless specifically limited by the context, a "transaction" may refer to a purchase of goods or services, a return of goods or services, a payment transaction, a credit transaction, or other transaction involving the consumer's bank account. As used herein, the term "products" refers to both goods and services.

FIG. 2 is a block diagram providing a more detailed illustration of an audible transaction system 200 in accordance with one embodiment of the invention. In general, the audible transaction system 200 includes a consumer 210 with a consumer device 215 and a vendor 220 having a point of sale 225 including a payment terminal 230. In the embodiment illustrated in FIG. 2A, the consumer device 215 is shown alongside the consumer 210 to indicate that the consumer device 215 is a mobile device that can be transported by the consumer 210. As discussed above, the consumer device 215 can be any number of mobile devices.

In this embodiment, the consumer device 215 includes a communication device 235, a processing device 240, a memory 245, and a listening device 250. In some embodiments, such as the embodiment discussed below with reference to FIG. 4, the consumer device includes a camera 252. The processing device 240 is connected with and generally controls the operation of the other components of the consumer device 215.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" generally refers to a device or combination of devices including one or more forms of computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

In the embodiment of the invention illustrated in FIG. 2, a processing device 255 is also located at the point of sale 225 and connected with the payment terminal 230. Some embodiments also have a display 257 connected with the payment terminal 230 and/or the processing device 255 for displaying some or all of the transaction information in a visually perceptible format. The processing device 255 is also connected with and controls a communication device 260 configured for communicating with a payment network 265. One of skill in the art will recognize, in view of this disclosure, that one embodiment of the payment network 265 includes communication pathways to and from both an acquiring bank, which manages the vendor's bank account, and an issuing bank, which manages the consumer's credit/debit account.

When the consumer 210 initiates a transaction, such as a payment transaction to pay for a product provided by the vendor 220, or a return transaction for returning a product to the vendor 220, the communication device 235 of the consumer device 215 establishes a connection (arrow 270) with the communication device 260 at the POS 225 of the vendor 220. In the wireless embodiment, this step typically begins with the processing device 240 controlling the communication device 235 so that the communication device 235 "listens" for communications from an outside communication device (such as 260) and/or transmits so that outside communication devices (such as 260) can recognize the presence of the consumer device 215. In one embodiment, radio frequency identification (RFID) devices are used as one or both of the communication devices 235 and 260 or are connected with one or both of the communication devices 235 and 260 to provide indications of the proximity of a consumer device 215 with a payment terminal 230. When communication device 235 recognizes the presence of a POS communication device 260, the connection can be established.

In other embodiments, the consumer device 215 connects via wired connection. For example, the consumer brings a consumer device 215 to the point of sale 225 and manually connects the consumer device 215 with the payment terminal 230 or the communication device 260. In one embodiment discussed above, the point of sale includes a communication device 260 such as a USB port and a USB cable for connecting with the USB port at the point of sale on one end and connecting with the consumer device 215 on the opposite end.

Once the consumer device 215 is connected with the payment terminal 230, the payment terminal 230 communicates transaction information to the consumer device 215 (arrow 275). The communication of transaction information may be prompted in several ways. In a first embodiment, the communication of transaction information is prompted automatically once both initiation of the transaction and a connection is established between the consumer device 215 and the payment terminal 230.

In a second embodiment, a consumer's card may prompt the audible transaction process once it has been swiped by the cashier or the consumer. The card may be swiped before or during the transaction process, and communicates to the payment terminal 230 that an audible transaction process is the consumer's preference. In one embodiment, the consumer's card is a credit/debit card that is being used to transfer account information for tendering payment for the transaction. In another embodiment, the consumer's card is a membership card such as a grocery store discount card. In various embodiments, the consumer card, (credit/debit card, membership card, or some other consumer card) has a memory such as a flash memory with stored consumer preferences indicating that an audible transaction process is preferred to the typical, visually-based transaction process. In various other embodiments, the consumer card indicates to the payment terminal 230, via access to an outside information source such as a remote database perhaps storing preferences for many consumers and maintained by the card-issuer, the consumer's preference for an audible transaction process. With regard to any of these embodiments, the consumer card may be swiped before or during the transaction and indicates to the payment terminal 230 the consumer's desire for an audible transaction process. It will be appreciated that, although a card is described herein, other devices may be used to indicate the consumer's preference for an audible transaction, such as other payment devices including, but not limited to, near-field-communication (NFC) payment devices. In one embodiment, the consumer device 215 is used as a NFC payment device and communicates the consumer's preference for audible transactions.

In a third embodiment, the consumer's preference for an audible transaction process may be prompted by the consumer plugging-in a personal listening device such as headphones, ear-buds or the like to the consumer device 215. When the consumer device 215 is already connected with a payment terminal 230 (arrow 270) upon connection of the personal listening device with the consumer device 215, the consumer device 215 indicates to the payment terminal 230 the consumer's preference for an audible transaction process, which is inferred from the consumer's plugging-in of the personal listening device. In another embodiment, the consumer device 215 prompts the consumer, either with a visual prompt, an audible prompt, a tactile prompt, or a combination of prompts, to choose whether to proceed with an audible transaction process once the personal listening device is connected. Then, the consumer device 215 receives the consumer input, either through speech recognition methods or via an input device, such as a keypad or touch-screen, and communicates the consumer's preference for proceeding with an audible transaction process if the consumer so chooses.

FIG. 3 is a block diagram providing a more detailed illustration of an audible transaction system 205 in accordance with another embodiment of the invention. In this embodiment, the consumer device 215 is located proximate the point of sale 225. In one embodiment, the consumer device 215 includes a pre-connected listening device 250, and in another embodiment, the consumer device 215 is configured for connecting with a listening device 250, such as a personal listening device. For example, in one embodiment, the consumer device 215 includes a headphone jack for connecting with a pair of headphones, which is one embodiment of the listening device 250.

When a consumer 210 initiates a transaction in this embodiment, the consumer 210 can prompt an audible transaction process in several ways. First, the consumer 210 can connect a listening device 250 with the consumer device 215 at the point of sale 225. The listening device 250 can be headphones, ear-buds or some other listening device. Second, the consumer 210 or the cashier can swipe the consumer's card or otherwise read the consumer's payment device or rewards device. As discussed above, the consumer's card can be a credit/debit card, a membership card, or the like. The card or other device either has stored preferences that are provided to the payment terminal 230 or is linked to pre-determined consumer preferences stored external to the system 205. Third, the system 205 can be configured to automatically operate with an audible transaction process. Fourth, the system 205 can prompt the consumer, audibly, visually or otherwise, to specify a preference by providing input either audibly or with some type of user input device such as a keypad, touch-screen or the like.

In another embodiment, the listening device 250 is already connected with the consumer device 215 at the point of sale 225. The listening device 250 in this embodiment can be one or more speakers, headphones, ear-buds or the like. In this embodiment, the second through fourth mechanisms of initiating an audible transaction process discussed above can be used. Specifically, the consumer 210 can swipe a card, indicating the consumer's preference, the system 205 can be automatically configured, or the system 205 can prompt the consumer 210 for input regarding preference.

FIG. 4 is a flow diagram illustrating a visual recognition audible transaction process 400. In this embodiment, the camera 252 of the consumer device 215 is configured for capturing video and/or snapshot images from the vendor's display 257 at the point of sale 225, as represented by block 410. As used herein the term "video" is an inclusive term intended to refer to one or more videos, one or more still images and/or one or more snapshot images taken from one or more videos. In some embodiments, the consumer device 215 is part of the vendor's point sale 225 as discussed with reference to FIG. 3, and the consumer device 215 includes a camera 252 for capturing the display 257. In other embodiments, the consumer device is separate from the point of sale 225, but the point of sale 225 includes a camera 252 connected with either the payment terminal 230 or the processing device 255 for capturing the video from the display 257. The video on the display 257 typically includes some or all of the transaction information.

For example, in one embodiment, the consumer device 215 includes a camera 252 for capturing the video of the display, as represented by block 410. The consumer 210 places the consumer device 215 within visual range of the vendor's display 257, and the camera 252 captures the video. The next step in the process, represented by block 420 is processing the video resulting in data representing the transaction information. This step is performed either by the consumer device 215 after capturing the video, or in embodiments where the camera 252 is part of the point of sale 225, by the processing device 255 at the point of sale 225. This may include performing an algorithm to convert any textual information captured from the display 257 into data representing the transaction information in an audible format. In this regard, some embodiments of the consumer device 215 include an image character recognition application stored in the memory 245 for processing video received from the camera, identifying transaction information therefrom, and converting the transaction information into an audio signal. In some embodiments, the camera 252 captures still images or screenshots from the display 257. In some of these embodiments, some or all captured still images are analyzed in order to discern any data representing transaction information.

The data representing the transaction information is then used to produce an audible transaction information signal as represented by block 430. Step 430 is performed by the processing device 240 of the consumer device 215 in embodiments where the camera 252 is part of the consumer device 215, and is performed by the processing device 255 at the point of sale in embodiments where the camera 252 is part of the point of sale 225. Finally, as represented by block 440, the audible transaction information signal is used to produce sound waves audible to the consumer 210. The listening device 250 receives the audible transaction information signal and produces sound waves audible to the consumer 210.

As will be appreciated by one of skill in the art, the present invention may be embodied as a method, apparatus (including a system), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet.

Computer-readable instructions for carrying out operations of the present invention may be written in an object-oriented, scripted or unscripted programming language such as Java, Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products according to embodiments of the invention. It will be understood that each block of the flowchart illustrations and/or block diagrams shown in FIGS. 1-4, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A payment terminal-implemented method for assisting a consumer using a consumer device during a transaction with a payment terminal disposed proximate a point of sale of a vendor, the method comprising:
   using a computer processor of the payment terminal to execute computer program code instructions stored in a non-transitory computer-readable medium of the payment terminal, wherein the computer program code instructions are structured to cause the computer processor to:
   establish, using a communication device of the payment terminal, a connection between the consumer device and the payment terminal;
   receive a transaction process preference from the consumer device, the transaction process preference originating from consumer input provided to the consumer device in response to a request from the consumer device to the consumer for input regarding the consumer's preference regarding whether or not the consumer prefers an audible transaction process, the transaction process preference indicating the consumer's preference for transaction processing including the consumer's preference for the audible transaction process;
   determine when the transaction process preference comprises an audible transaction process preference corresponding to the consumer, the audible transaction process preference indicating to the payment terminal the consumer's preference for an audible transaction process rather than a traditional visual transaction process;
   initiate a communication, in response to determining the consumer's audible transaction process preference, using the communication device of the payment terminal, of transaction information between the payment terminal and the consumer device; and
   initiate production of an audible transaction information signal based at least in part on some or all of the transaction information, the audible transaction information signal configured to be used for producing sound waves audible to the consumer for assisting the consumer during the transaction as part of the audible transaction process.

2. The method of claim 1 wherein the transaction comprises a purchase of one or more products.

3. The method of claim 1, wherein the consumer's audible transaction preference is received in response to reading information from a consumer card.

4. The method of claim 1 wherein the consumer device comprises a mobile device selected from the group consisting of a smartphone, a personal digital assistant, a personal global positioning system receiver, a cellular phone, and a personal music player.

5. The method of claim 1 wherein the consumer device comprises an immobile device disposed proximate the point of sale and wherein establishing a connection comprising establishing a permanent connection between the consumer device and the payment terminal.

6. The method of claim 1, wherein the consumer's audible transaction preference is received in response to detecting a physical connection of a consumer listening device with the payment terminal.

7. The method of claim 1 wherein the computer processor is further to initiate production of sound waves audible to the consumer using the audible transaction information signal.

8. The method of claim 7 wherein the computer processor is further to establish a connection between the consumer device and a personal listening device and wherein the producing sound waves audible to the consumer using the audible transaction information signal is performed by the personal listening device.

9. The method of claim 8 wherein the personal listening device is selected from the group consisting of a set of headphones, a headset, one or more earphones, one or more ear-buds, one or more hearing assistance devices, and one or more personal speakers.

10. The method of claim 7 wherein the computer processor is further to establish a connection between the consumer device and a public listening device and wherein the producing sound waves audible to the consumer using the audible transaction information signal is performed with the public listening device.

11. The method of claim 10 wherein the public listening device comprises one or more public speakers.

12. The method of claim 1 wherein transaction information comprises at least one selected from the group consisting of product identification information, product quantity information, product pricing information, product discount information, running balance owed information, final balance owed information, and payment method information.

13. An audible transaction system for assisting a consumer during a transaction with a vendor at a point of sale comprising:
 a consumer device; and
 a payment terminal disposed proximate the point of sale, the payment terminal configured to:
  connect with the consumer device,
  receive a transaction process preference from the consumer device, the transaction process preference originating from consumer input provided to the consumer device in response to a request from the consumer device to the consumer for input regarding the consumer's preference regarding whether or not the consumer prefers an audible transaction process, the transaction process preference indicating the consumer's preference for transaction processing including the consumer's preference for the audible transaction process;
  determining when the transaction process preference comprises an audible transaction process preference corresponding to the consumer, the audible transaction process preference indicating to the payment terminal the consumer's preference for an audible transaction process rather than a traditional visual transaction process, and
  in response to determining that the customer desires the audible transaction process, communicate transaction information to the consumer device,
 wherein the consumer device is configured to process the transaction information to create an audible transaction information signal based at least in part on some or all of the transaction information, and
 wherein the consumer device is further configured to communicate the audible transaction information signal.

14. The audible transaction system of claim 13 further comprising a listening device for communicating with the consumer device and receiving the audible transaction information signal and for producing sound waves audible to the consumer using the audible transaction information signal.

15. The audible transaction system of claim 13 wherein the consumer device comprises a listening device for receiving the audible transaction information signal and producing the sound waves audible to the consumer based at least in part on the audible transaction information signal.

16. The audible transaction system of claim 15 wherein the listening device comprises one or more personal listening devices.

17. The audible transaction system of claim 15 wherein the listening device comprises one or more public listening devices.

18. The audible transaction system of claim 16 wherein the one or more personal listening devices are selected from the group consisting of a set of headphones, a headset, one or more earphones, one or more ear-buds, one or more hearing assistance devices, and one or more personal speakers.

19. The audible transaction system of claim 17 wherein the one or more public listening devices comprise one or more public speakers.

20. The audible transaction system of claim 13 wherein the transaction comprises the purchase of one or more products.

21. The audible transaction system of claim 13 wherein the consumer device comprises a mobile device.

22. The audible transaction system of claim 21 wherein the mobile device is selected from the group consisting of a smartphone, a personal digital assistant, a personal global positioning system receiver, a cellular phone, and a personal music player.

23. The audible transaction system of claim 13 wherein the consumer device comprises an immobile device disposed proximate the point of sale.

24. The audible transaction system of claim 23 wherein the consumer device and the payment terminal are permanently connected.

25. The audible transaction system of claim 13 wherein the consumer device and the payment terminal are connected wirelessly.

26. The audible transaction system of claim 13 wherein the transaction information comprises at least one selected from the group consisting of product identification information, product quantity information, product pricing information, product discount information, running balance owed information, final balance owed information, and payment method information.

27. A payment terminal for assisting a consumer using a consumer device during a transaction with a vendor at a point of sale, the payment terminal comprising:
 a computer processor;
 a communication device in communication with the computer processor; and
 a non-transitory computer-readable medium in communication with the computer processor, the medium configured to store computer program code instructions,
 wherein the computer processor is configured to execute the computer program code instructions, and
 wherein the instructions are structured to cause the computer processor to:
  establish, using the communication device, a connection between the consumer device and the payment terminal;
  receive a transaction process preference from the consumer device, the transaction process preference originating from consumer input provided to the consumer device in response to a request from the consumer device to the consumer for input regarding the consumer's preference regarding whether or not the consumer prefers an audible transaction process, the transaction process preference indicating the consumer's preference for transaction processing including the consumer's preference for the audible transaction process;

determine when the transaction process preference comprises an audible transaction process preference corresponding to the consumer, the audible transaction process preference indicating to the payment terminal the consumer's preference for an audible transaction process rather than a traditional visual transaction process, initiate a communication, in response to determining the consumer's audible transaction process preference, using the communication device, of transaction information between the payment terminal and the consumer device; and initiate production of an audible transaction information signal based at least in part on some or all of the transaction information, the audible transaction information signal configured to be used for producing sound waves audible to the consumer.

28. The payment terminal of claim 27, wherein the instructions are structured to cause the computer processor to establish, using the communication device, a permanent connection between the consumer device and the payment terminal.

29. The payment terminal of claim 27, further comprises a sound producing device for producing sound waves audible to the consumer using the audible transaction information signal.

30. A computer program product comprising a non-transitory computer-readable medium, the computer-readable medium comprising computer-executable program code stored therein program code comprising:

instructions for establishing a connection between a consumer device and a payment terminal disposed proximate a point of sale;

instructions for receiving a transaction process preference from the consumer device, the transaction process preference originating from consumer input provided to the consumer device in response to a request from the consumer device to the consumer for input regarding the consumer's preference regarding whether or not the consumer prefers an audible transaction process, the transaction process preference indicating the consumer's preference for transaction processing including the consumer's preference for the audible transaction process;

instructions for determining when the transaction process preference comprises an audible transaction process preference corresponding to the consumer, the audible transaction process preference indicating to the payment terminal the consumer's preference for an audible transaction process rather than a traditional visual transaction process, instructions for, in response to determining the consumer's audible transaction process preference, communicating transaction information between the payment terminal and the consumer device; and instructions for producing an audible transaction information signal based at least in part on some or all of the transaction information, the audible transaction information signal to be used for producing sound waves audible to the consumer.

31. The computer program product of claim 30, wherein in the transaction comprises a purchase of one or more products.

32. The computer program product of claim 30, wherein the consumer device comprises a mobile device.

33. The computer program product of claim 30, wherein the mobile device is selected from the group consisting of a smartphone, a personal digital assistant, a personal global positioning system receiver, a cellular phone, and a personal music player.

34. The computer program product of claim 30, wherein the consumer device comprises an immobile device disposed proximate the point of sale.

35. The computer program product of claim 34 wherein the instructions for establishing a connection comprise instructions for establishing a permanent connection between the consumer device and the payment terminal.

36. The computer program product of claim 30 wherein the program code further comprises instructions for producing sound waves audible to the consumer using the audible transaction information signal.

37. The computer program product of claim 36 wherein the program code further comprises instructions for establishing a connection between the consumer device and a personal listening device and wherein the instructions for producing sound waves audible to the consumer using the audible transaction information signal include instructions for using the personal listening device.

38. The computer program product of claim 37 wherein the personal listening device is selected from the group consisting of a set of headphones, a headset, one or more earphones, one or more ear-buds, one or more hearing assistance devices, and one or more personal speakers.

39. The computer program product of claim 36 wherein the program code further comprises instructions for establishing a connection between the consumer device and a public listening device and wherein the instructions for producing sound waves audible to the consumer using the audible transaction information signal include instructions for using the public listening device.

40. The computer program product of claim 39 wherein the public listening device comprises one or more public speakers.

41. The computer program product of claim 30 wherein the transaction information comprises at least one selected from the group consisting of product identification information, product quantity information, product pricing information, product discount information, running balance owed information, final balance owed information, and payment method information.

42. An apparatus for assisting a consumer during a transaction with a vendor at a point of sale, the point of sale comprising a terminal, the apparatus comprising:

an input device configured to receive transaction information from the terminal in response to the terminal receiving a transaction process preference from a consumer device, wherein the transaction process preference originating from consumer input provided to the consumer device in response to a request from the consumer device to the consumer for input regarding the consumer's preference regarding whether or not the consumer prefers an audible transaction process, the transaction process preference indicating the consumer's preference for transaction processing including the consumer's preference for the audible transaction process and, in response to determining that the transaction process preference comprises an audible transaction process preference corresponding to the consumer, wherein the audible transaction process preference indicates to the terminal the consumer's preference for an audible transaction process rather than a traditional visual transaction process; and a processor configured to generate an audible transaction information signal based at least in part on some or all of the transaction information, the audible transaction information signal to be used for producing sound waves audible to the consumer.

43. The apparatus of claim 42, further comprising a speaker configured to use the audible transaction information signal to generate sound waves audible to the consumer.

44. The apparatus of claim 42, wherein the input device comprises a camera configured to receive an image of transaction information displayed on a display device of the terminal, and wherein the processor is configured to determine the transaction information from the image.

45. The apparatus of claim 44, wherein the image comprises video of the display device.

46. The apparatus of claim 44 further comprising:

a memory comprising computer executable program code stored therein for determining transaction information from images of the display device and generating the audible transaction information signal based on the determined transaction information.

47. A computer program product comprising a non-transient computer-readable medium, the computer-readable medium comprising computer-executable program code stored therein, the computer executable program code comprising:

a first executable portion configured to receive transaction information from a point of sale terminal in response to the terminal receiving a transaction process preference from a consumer device, wherein the transaction process preference originating from consumer input provided to the consumer device in response to a request from the consumer device to the consumer for input regarding the consumer's preference regarding whether or not the consumer prefers an audible transaction process, the transaction process preference indicating the consumer's preference for transaction processing including the consumer's preference for the audible transaction process, and, in response to determining that the transaction process preference comprises an audible transaction process preference corresponding to the consumer, wherein the audible transaction process preference indicates to the terminal the consumer's preference for an audible transaction process rather than a traditional visual transaction process; and a second executable portion configured to generate an audible transaction information signal based at least in part on some or all of the transaction information, the audible transaction information signal to be used for producing sound waves audible to the consumer.

48. The computer program product of claim 47, wherein the first executable portion is configured to receive transaction information in the form of an image of the transaction information displayed on a display device of the point of sale terminal, and wherein the second executable portion is configured to determine the transaction information from the image and generate the audible transaction information signal based thereon.

49. The computer program product of claim 48, wherein the image comprises video of the display device displaying transaction amount information.

\* \* \* \* \*